(12) United States Patent
Inaba et al.

(10) Patent No.: US 6,772,725 B2
(45) Date of Patent: Aug. 10, 2004

(54) BALANCE SHAFT, HOUSING FOR BALANCE SHAFT AND ENGINE OIL RETURN PASSAGE

(75) Inventors: Toshiyuki Inaba, Saitama (JP); Yusuke Endo, Saitama (JP); Osamu Murakami, Saitama (JP); Hirotsugu Kudo, Saitama (JP); Kenji Fujiki, Saitama (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/274,149

(22) Filed: Oct. 21, 2002

(65) Prior Publication Data

US 2003/0075136 A1 Apr. 24, 2003

(30) Foreign Application Priority Data

Oct. 22, 2001 (JP) .................................. P. 2001-323393
Oct. 23, 2001 (JP) .................................. P. 2001-324878
Oct. 24, 2001 (JP) .................................. P. 2001-326140

(51) Int. Cl.[7] .............................................. F02B 75/06
(52) U.S. Cl. ................................................. 123/192.2
(58) Field of Search .......................... 123/192.2, 195 H, 123/196 R, 195 C; 74/603, 604; 184/106, 1.5, 6.2, 6.13, 11.1–11.5

(56) References Cited

U.S. PATENT DOCUMENTS

| 4,690,111 A | * | 9/1987 | Kohno et al. ............. 123/192.2 |
| 4,696,267 A | * | 9/1987 | Kohno et al. ............. 123/192.2 |
| 5,305,656 A | * | 4/1994 | Kamiya et al. ................ 74/604 |
| 6,244,237 B1 | * | 6/2001 | Sayama et al. ........... 123/192.2 |
| 6,471,008 B1 | * | 10/2002 | Iwata .......................... 184/106 |

* cited by examiner

Primary Examiner—Tony M. Argenbright
Assistant Examiner—Hyder Ali
(74) Attorney, Agent, or Firm—Armstrong, Kratz, Quintos, Hanson & Brooks, LLP

(57) ABSTRACT

An engine including an engine oil return passage for returning engine oil from a cylinder head side to an oil pan having a balance shaft forming a balancing system for said engine; and a housing disposed below a crankshaft for accommodating rotatably therein the balance shaft. A part of the engine oil return passage is provided in the housing.

20 Claims, 12 Drawing Sheets

BALANCE SHAFT, HOUSING FOR BALANCE SHAFT AND ENGINE OIL RETURN PASSAGE

BACKGROUND OF THE INVENTION

1. Field of the Invention

The present invention relates to a balancing system for an engine, and more particularly to a housing adapted to be disposed within an oil pan for accommodating balance shafts, balance shafts for the balancing system which are each provided with a counterweight portion, and an engine oil return passage provided in the engine comprising below a crankshaft, a housing for accommodating rotatably therein balance shafts.

2. Description of the Related Art

A balancing system is publicly known in, for example, JP-A-2001-74104 in which balance shafts are disposed below a crankshaft in an oil pan, so that the rotation of the crankshaft is transferred to the balance shafts via a chain/sprocket mechanism or gear mechanism.

Because the balance shafts in the balancing system are provided below an oil level within the oil pan, the balance shafts are entirely covered with a housing in order to eliminate any inconveniences that would be caused by the agitation of oil by the balance shafts. In addition, because a large amount of oil remaining within the housing constitutes rotational resistance against the balance shafts, oil remaining within the housing must be discharged as soon as possible, and the above Japanese Unexamined Patent Publication discloses a construction in which oil within the housing is discharged by the rotating balance shafts.

In the prior art construction, however, because the oil discharge ports are constituted by slits formed in the joint surface between the upper and lower housing, the slits are submerged below the oil level. Therefore, when this construction is adopted in an engine which is installed such that axes of cylinders are inclined relative to an orientation which is normal to an axis of the crankshaft, it is conceivable that oil flows back into the housing.

In order to secure the designed amount of oil to be discharged with the oil discharge ports being provided at positions that are not submerged below the oil level or in the upper housing, the area of the discharge ports has to be increased. However, such a construction tends to reduce the rigidity of the upper housing.

Further, a balancing system is disclosed in JP-B-3-18761U in which balance shafts each provided with a counterweight portion are disposed below a crankshaft.

With the balance shafts disclosed in the Japanese Examined Utility Model Publication, thrust supporting faces provided at a journal portion of each of the balance shafts for restricting axial movements of the balance shaft are designed to slidably contact with end faces of an opening in a bearing hole. In addition, it is known that thrust supporting faces are integrally formed on the balance shafts in order to reduce the number of components.

Incidentally, because the thrust supporting faces integrally formed on the journal portion are naturally provided with a larger diameter than that of the journal portion, according to the above construction, irrespective of the position of the weight, a part of the thrust supporting face situated on the opposite side of the balance shaft to the side thereof where the weight is provided becomes like a flange, and an outer circumferential side of the part comes to have a cantilever-like construction. Thus, the rigidity of the thrust supporting face at the part tended to be insufficient.

Moreover, while engine oil which has been used to lubricate and cool a valve train provided on a cylinder head is returned to an oil pan via a return passage provided in a cylinder block or the like, it is preferable that return oil is prevented from contacting the crankshaft which rotates at high speed within a crankcase in order that atomized oil is not mixed in blow-by gas.

There are known as a method for this purpose a construction in which a pipe extending to below an oil level in the oil pan is connected to a downstream end of a return passage provided in a cylinder block and a construction in which a return passage extending to the vicinity of an oil level is provided in a crankcase (JP-A-61-113910U).

According to the conventional constructions, with the construction utilizing the pipe, because the pipe comprising a separate member is required, the number of components is increased, and moreover, the number of man hours for mounting the pipe is also increased. In addition, with the construction is which the return passage is provided in the crankcase, because a mold for the crankcase becomes complicated, and it is difficult to provide the oil discharge port at a position where the oil discharge port is always allowed to be submerged below the oil level irrespective of a change in vehicle posture or driving condition.

SUMMARY OF THE INVENTION

The present invention has been made to solve the problems inherent in the prior art.

A first object of the present invention is to provide a housing for balance shafts which can restrain the decrease in rigidity of the upper housing while securing the area of the oil discharge ports and which is improved such that oil is difficult to contact the balance shaft.

A second object of the present invention is to provide balance shafts for a balancing system for an engine which are improved so as to increase the rigidity of the flange-like thrust supporting faces.

A third object of the present invention is to provide balance shafts for a balancing system for an engine which are improved so as to suppress an increase in weight resulting from reinforcement to a minimum level.

A fourth object of the present invention is to provide an engine oil return passage which is constructed to be formed without calling for increases in the number of components and the number of man hours required for production.

In addition, a fifth object of the present invention is to provide an engine oil return passage which is constructed such that an oil discharge port can be provided at a position which is not affected by changes in vehicle posture and driving condition.

With a view to attaining the above objects, according to a first aspect of the present invention, a housing (14U, 14L) for balance shafts adapted to be disposed within an oil pan (5) for accommodating therein balance (13L, 13R) shafts comprises an upper housing (14U) and a lower housing (14L) which are divided vertically along a plane parallel to axes of the balance shafts, and oil discharge ports (44a, 44b) and vertical walls (47) are provided on the upper housing which vertical walls (47) are provided so as to extend from portions at inner edge portions of the oil discharge ports which extend in parallel with the axis of the balance shaft toward a joint surface thereof with the lower housing.

According to the construction, not only can the decrease in rigidity of the upper housing be restrained while securing the area of the oil discharge ports but also the contact of oil flowing in from the oil discharge ports to the balance shafts can be restrained by the vertical walls. Thus, this results in no increase in rotational resistance.

According to a second aspect of the present invention, the vertical walls extend to reach the joint surface with the lower housing.

According to the construction, not only can the decrease in rigidity of the upper housing be restrained further but also the contact of the oil flowing in from the discharge oil ports to the balance shaft can be restrained further.

According to a third aspect of the present invention, there are provided within the housing two balance shafts which have different heights relative to an oil level and which are parallel to each other, the vertical walls are formed on a side of the upper housing where one of the balance shafts is disposed which is easier to contact oil flowing in from the oil discharge ports, and at least part of an oil inlet passage (a tubular passage 26) communicating from an oil strainer to an oil pump is provided in the lower housing on a side thereof where the other of the balance shafts is disposed in a manner so as to extend in parallel with the axis of the balance shaft.

According to the construction, not only can the rigidity of the upper housing on the side thereof where the one of the balance shafts is disposed be increased to thereby increase the supporting rigidity of the one of the balance shafts but also the contact of oil flowing in from the oil discharge ports to the one of the balance shafts can be prevented. In addition, the rigidity of the lower shaft on the side thereof where the other of the balance shafts is disposed can be increased by the oil inlet passage to thereby increase the supporting rigidity of the other balance shaft.

According to a fourth aspect of the present invention, ribs (46) are formed on an upper face of the upper housing which are parallel to the axis of the balance shaft and which connect, respectively, to the vertical walls.

According to the construction, the rigidity of the upper housing can be largely increased to thereby increase further the supporting stability of the balance shaft, and at the same time oil remaining on the upper surface of the upper housing can be restrained from entering the interior of the housing from the oil discharge ports.

According to a fifth aspect of the present invention, there are provided balance shafts (13L, 13R) for a balancing system (4) for an engine each having flange-like thrust supporting faces (19) which are integrally formed on a journal portion (16c) for restricting axial movements of a counterweight portion (17) and which each have a larger diameter than that of the journal portion, the balance shafts each having ribs (21) connected, respectively, to backs of the flange-like thrust supporting faces and extending in an axial direction on an opposite side to a side where the counterweight portion is provided.

According to the construction, because the rigidity of the flange-like thrust supporting faces in a radial direction can be increased, a highly accurate thrust control can be implemented. In addition, because the ribs are connected, respectively, to the backs of the thrust supporting faces and are caused to extend in the axial direction, an increase in weight on the side opposite the side where the counterweight portion is provided can be suppressed.

In addition, according to a sixth aspect of the present invention, in a construction as set forth in the fifth aspect of the present invention, the journal portion is provided at an axially central portion of the counterweight portion, and the flange-like thrust supporting faces are integrally formed at axial ends of the journal portion. According to the construction, because the rigidity of the journal portion to which a largest load is applied can be increased, the stable support of the balance shafts can be attained. In addition, in a case where lubricating oil is supplied to the journal portion, because lubricating oil is held by the flange-like thrust supporting faces, the lubricating effect on the journal portion is improved.

Furthermore, according to a seventh aspect of the present invention, the ribs are constructed to connect the two journal portions situated at the axial ends of the counterweight portion. According to the construction, because the rigidity between the journal portions can be increased, the diameter of a shaft portion can be reduced while obtaining a desired rotational mass to thereby suppress an increase in weight.

According to an eighth aspect of the present invention, in addition to a construction as set forth in the seventh aspect of the present invention, the height of the rib is constructed to be gradually reduced so that there is provided a valley at an axially intermediate portion of the rib. According to the construction, the stress distribution can be normalized to thereby suppress further the increase in weight.

According to a ninth aspect of the present invention, part (a downstream portion 142) of an engine oil return passage for returning engine oil from a cylinder head side to an oil pan (5) is provided in a housing (14U, 14L) provided below a crankshaft (1) for accommodating rotatably therein balance shafts (13L, 13R).

According to the construction, it is possible to form the engine oil return passage which opens below the oil level in the oil pan without calling for increases in the number of components of the engine itself and the number of man hours required for production.

According to a tenth aspect of the present invention, the housing comprises an upper housing and a lower housing which are divided vertically, and part (grooves 42b, 42c) of the return passage is formed in a joint surface between both the housings.

According to the construction, the passage can be laid out relatively easily so that the oil discharge port can be positioned at an optional position, and moreover, since the momentum of return oil can be reduced, engine oil within the oil pan is allowed to be kept unstirred.

According to an eleventh aspect of the present invention, an oil discharge port (143) of the return passage opens at a position adjacent to a suction port (29) of an oil strainer (25) provided on a bottom of the housing.

According to the construction, it is possible to provide the oil discharge port at the position where the oil discharge port is allowed to be always submerged below the oil level irrespective of a change in vehicle posture or driving condition.

In particular, according to a construction in which a portion (a tubular portion 144) where the oil discharge port opens is directly connected to an oil strainer mounting portion (28) which is integrally formed on the bottom of the housing (a twelfth aspect of the invention), can the oil discharge port be free from being affected by changes in vehicle posture and driving condition, but also the rigidity of the portion where the oil discharge port opens can be increased.

DETAILED DESCRIPTION OF THE PREFERRED EMBODIMENTS

The present invention will be described in detail below with reference to the accompanying drawings.

<First Embodiment>

Figure 1:
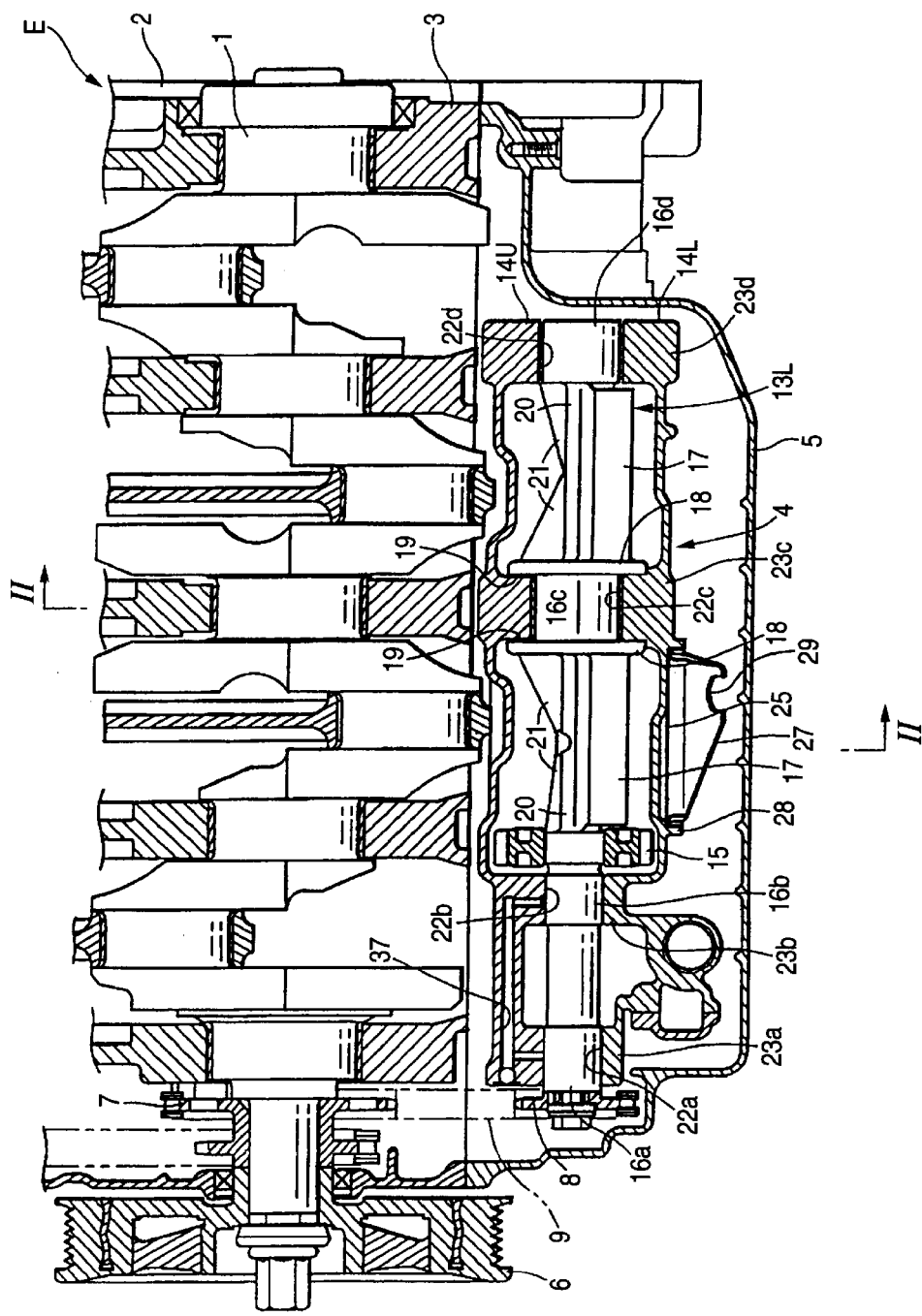
FIG. 1 is a front sectional view showing a main part of an engine to which first and second embodiments of the present invention is applied with the main part being partially cut away.
Figure 2:
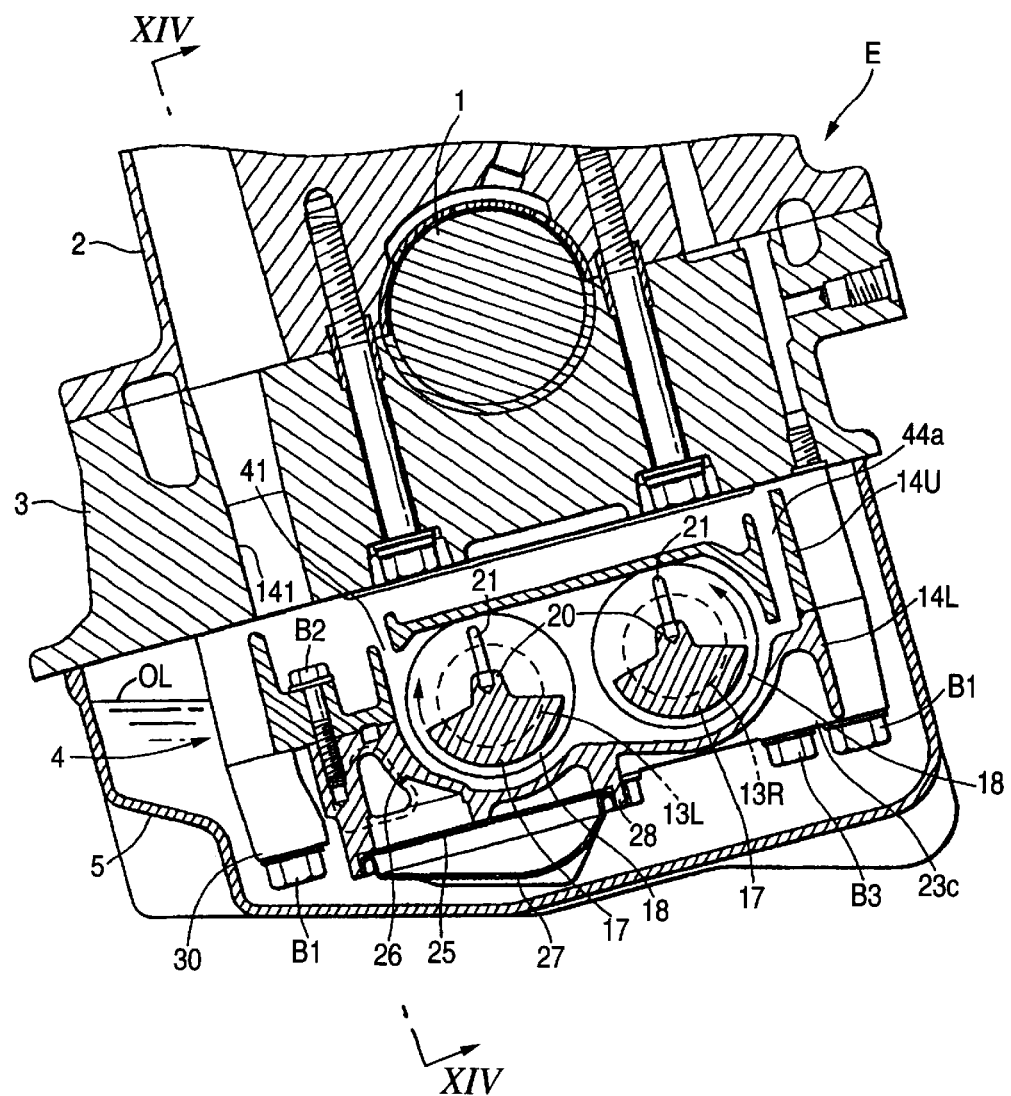
FIG. 2 is a side sectional view taken along the line II—II in FIG. 1.

As shown in FIGS. 1 and 2, this engine E is an in-line four-cylinder engine of the first embodiment in which a crankshaft extends in a horizontal direction, includes a cylinder block 2, a lower block 3, a balancing system 4 and an oil pan 5, and is installed on a vehicle body such that the axes of cylinders are inclined relative to an orientation which is normal to the axis of the crankshaft 1.

The balancing system 4 is constructed to reduce secondary vibrations that are caused by the reciprocating motion of the pistons and is fastened to a lower surface (below of the crankshaft 1) of the lower block 3 which inclines downwardly in a leftward direction (hereinafter, leftward and rightward directions are referred to as respective directions relative to a crank pulley) with through bolts B1 which are inserted from below into left- and right-side end portions thereof with the balancing system 4 being encompassed by the oil pan 5. This balancing system 4 is constructed so as to be driven to rotate by the rotational force of the crankshaft 1 which is transmitted via a large sprocket 7 fixed to a back side of the crank pulley being a front end portion of the crankshaft 1 (hereinafter, a crank pulley side is referred to as a front side), a small sprocket 8 fixed to a front end of a left-side balance shaft (which will be described in detail later) and a link chain 9 extended between both the large and small sprockets 7, 8.

The balancing system 4 includes a pair of left and right balance shafts 13L, 13R which are substantially of a similar configuration, and an upper housing 14U and a lower housing 14L which are vertically divided into two halves along a plane passing through centers of both the left and right balance shafts 13L, 13R (a plane parallel to axes of the balance shafts) such that these two balance shafts 13L, 13R are supported and accommodated in parallel with each other at positions which are different in height relative to an oil level.

Both the balance shafts 13L, 13R are interlocked with and connected to each other through helical gears 15 (only one of which is shown) which are integrally connected to the respective balance shafts 13L, 13R. Here, as has been described above, the rotational force of the crankshaft 1 is transmitted to the left balance shaft 13L via the large sprocket 7, the small sprocket 8 and the link chain 9, whereby the left balance shaft 13L is driven to rotate at twice the rotating speed of the crankshaft 1 in the same direction as that in which the crankshaft 1 rotates. Then, the right balance shaft 13R is driven to rotate in an opposite direction to the rotating direction of the balance shaft 13L through mesh engagement of the helical gears 15.

On both the balance shafts 13L, 13R, first and second journal portions 16a, 16b of a relatively small diameter are integrally formed ahead of the helical gear 15 and third and fourth journal portions 16c, 16d of a relatively large diameter are integrally formed rearward of the helical gear 15. In addition, counterweight portions 17 are integrally formed on rear-side portions of the respective balance shafts 13L, 13R which counterweight portions have centers of gravity which deviate radially outwardly from the center of rotation and are divided into two halves in such a manner as to hold therebetween the third journal portion 16c. In other words, the third journal portion 16c is provided at an axially central portion of the two counterweight portions 17 which are provided to align in series.

Large-diameter flange portions 18 are formed on confronting end portions of the front and rear counterweight portions 17 which hold therebetween the third journal portion 16c. Thrust supporting faces 19 are formed on confronting end faces of the respective flange portions 18. Thus, according to the construction in which the flange portion 18 which supports a thrust load is provided at the axial ends of the third journal portion 16c, when lubricating oil is supplied to the third journal portion 16c, because lubricating oil so supplied is held by the thrust supporting faces 19, this contributes to the improvement in lubricating effect on the journal portion.

Figure 3:
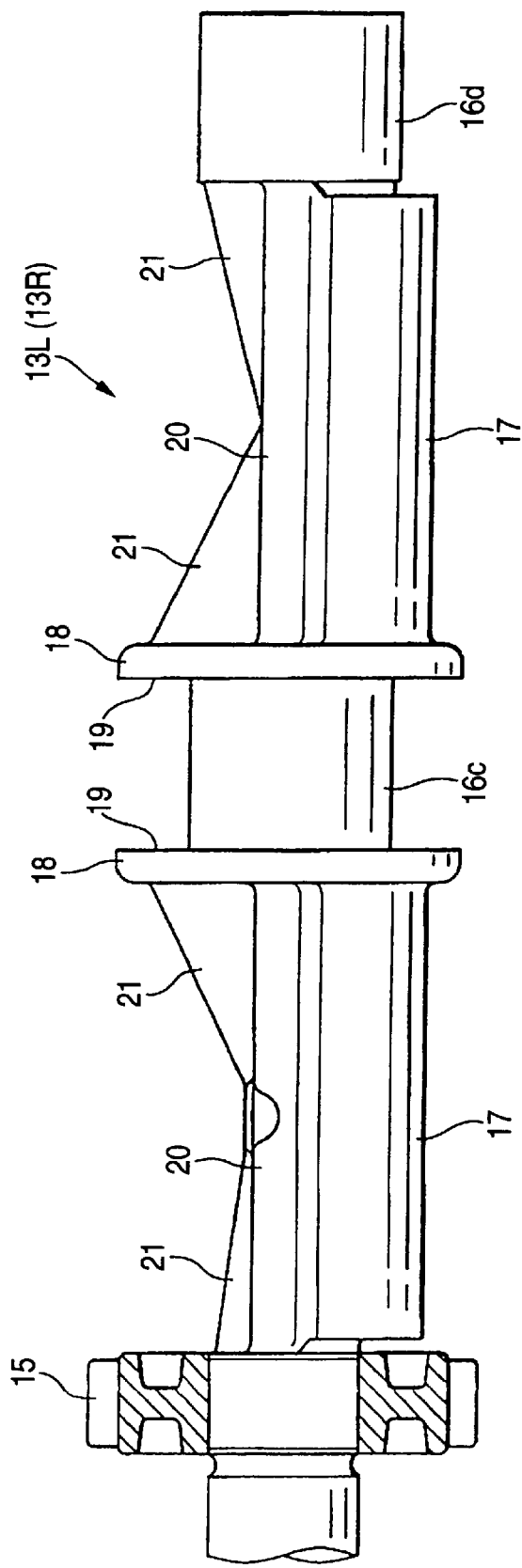
FIG. 3 is a side view showing a single balance shaft of the first embodiment which is partially cut away.

As shown also in FIG. 3, shaft portions 20 of the counterweight portions 17 are made relatively small in diameter in order to obtain a desired equivalent rotational mass with the counterweight portions 17 being made as small as possible. Then, not only to compensate for the decrease in rigidity of the shaft portions 20 resulting from the decrease in diameter thereof but also to compensate for the rigidity of the thrust supporting faces 19 with respect to the radial direction, ribs 21 are provided on an opposite side of both the shaft portions 20 to a side thereof where the counterweight portions 17 are provided so as to extend along the full length of the respective counterweight portions 17 in such a manner so as to connect axially between the back of the thrust supporting face 19 at the flange portion 18 provided on a front side of the third journal portion 16c and a mounting portion of the helical gear 15, as well as between the back of the thrust supporting face 19 at the flange portion 18 provided behind the third journal portion 16c and the fourth journal portion 16d. Thus, according to the construction in which the ribs 21 are connected to both the flange portions 18 provided at the axial ends of the third journal portion 16c to which the largest load is applied, because the rigidity of the relevant journal portion is increased largely, the construction can contribute to the stable support of the respective balance shafts 13L, 13R.

Figure 4:
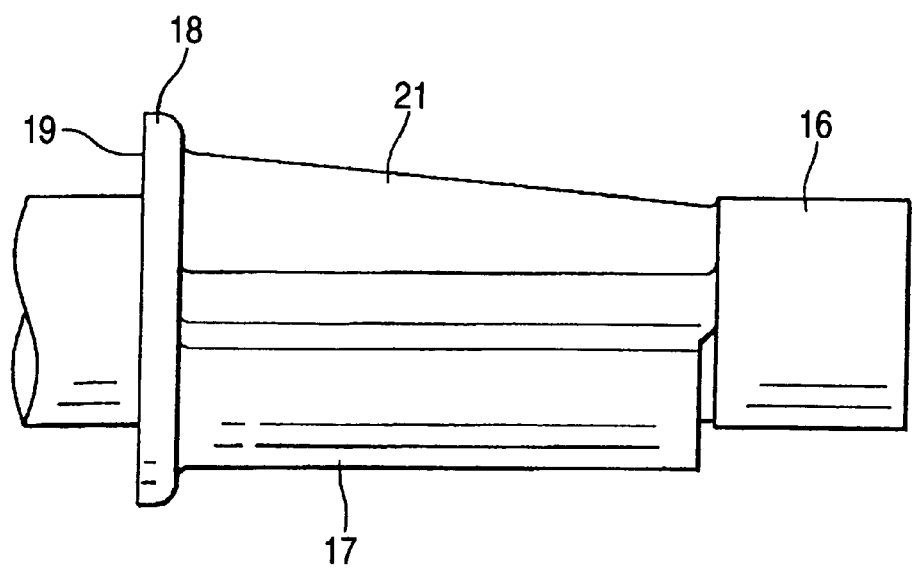
FIG. 4 is a partial side view showing another form of the balance shaft.

As shown in FIG. 4, while the rib 21 may connect substantially linearly circumferential edges of the journal portion 16 and the flange portion 18 which correspond to each other, in order to suppress an increase in weight due to the provision of the rib to a minimum level and normalize the stress distribution, as shown in FIGS. 1 and 3, the rib 21 is preferably formed into a tapered configuration in which the radial dimension thereof reduces as the rib 21 extends toward the axial center of each counterweight portion 17.

Figure 5:
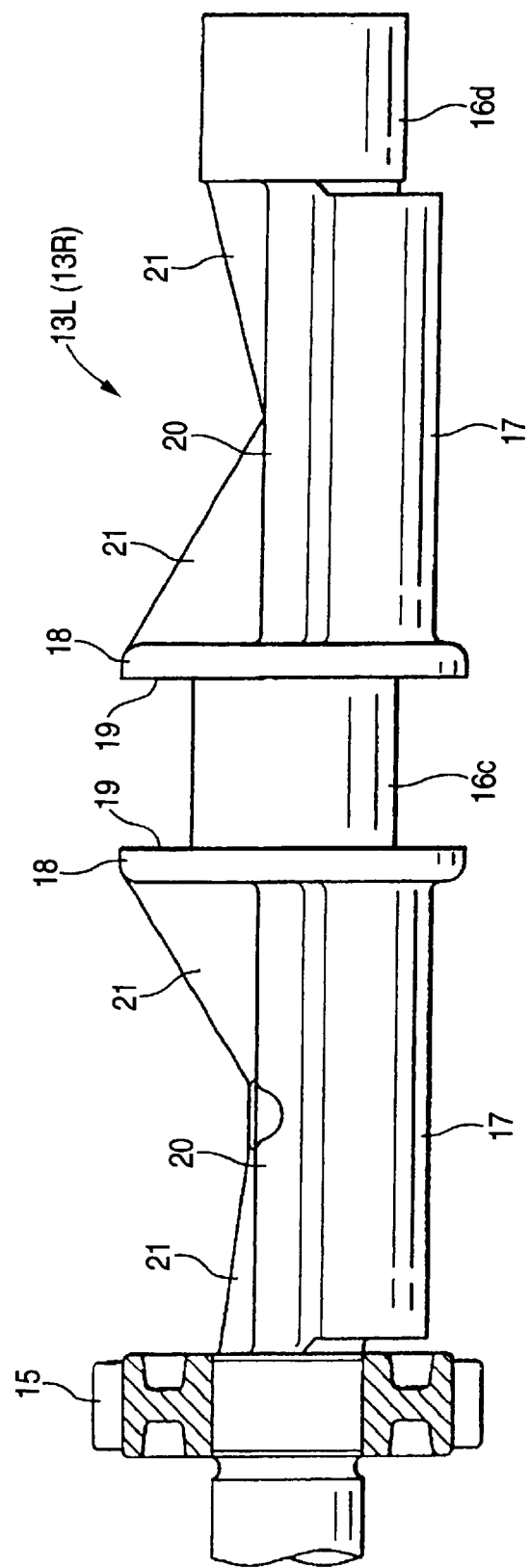
FIG. 5 is a side view, partially cut away, showing a still another form of the balance shaft.

In this connection, the thickness (a dimension with respect to an orientation normal to the axis) of the ribs connected to the flange portions 18 provided at the axial ends of the third journal portion 16c is preferably limited to a minimum level as required in order to suppress the increase in weight, and while making the thickness of the ribs 21 smaller than the thickness (a dimension with respect to an orientation along the axis) of the flange portions 18 contributes to the reduction in weight, in order to compatibly realize the increase in rigidity and suppression of increase in weight, it is optimum that the thickness of the flange portions 18 is made substantially identical to the thickness of the ribs 21. In addition, as shown in FIG. 5, in the event that the rib 21 is constructed to be connected to the outermost circumference of the flange portion 18, the rigidity of the flange portion 18 can further be increased.

Furthermore, while there may occur, as a matter of conveniences a necessity that the weights of the counterweight portions 17 at both the ends of the third journal portion 16c are differentiated from each other depending upon the displacement or entire construction of an engine, as this really occurs, making the height and/or thickness of the rib on the heavier counterweight portion larger than those of the rib on the lighter counterweight portion is effective in increasing the strength of the thrust supporting face to which a larger thrust load is applied.

On the other hand, the respective journal portions 16a to 16d of both the balance shafts 13L, 13R are supported by first to fourth bearing holes 22a to 22d which are each divided into two halves which form the bearing hole when both the upper and lower housings 14U, 14L are jointed together.

The respective journal portions 16a to 16d of both the balance shafts 13L, 13R are placed on the halves of the respective bearing holes 22a to 22d which are situated on the lower housing 14L side, and in this state, with the remaining halves of the respective bearing holes 22a to 22d which are situated on the upper housing 14U side being aligned with the respective journal portions 16a to 16d of both the balance shafts 13L, 13R, both the upper and lower housings 14U, 14L are jointed together, whereby both the balance shafts 13L, 13R are accommodated rotatably in both the housings 14U, 14L. Then, the thrust supporting faces 19 are constructed to come into abutment with the front and rear end faces of a bearing wall 23c in which the third bearing hole 22 is formed, respectively, to thereby support the thrust force.

Figure 6:
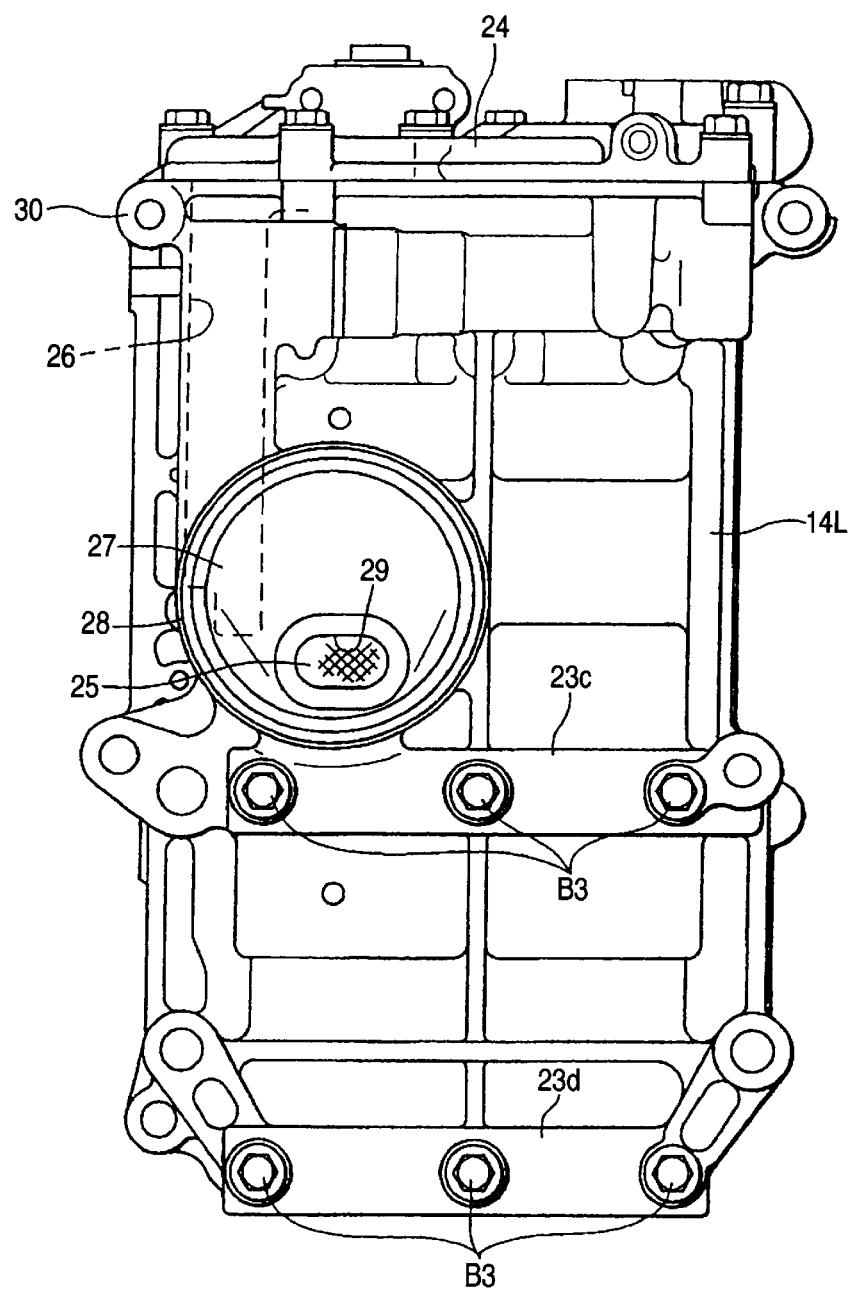
FIG. 6 is a bottom view of a balancing system of the first embodiment.

As shown in FIGS. 2 and 6, both the upper and lower housings 14U, 14L are fastened together with a plurality of bolts B2 which are passed through the upper housing into the lower housing from above at appropriate positions and three bolts B3 which are passed through the lower housing at each of the respective bearing walls 23c, 23d where the third and fourth bearing holes 22c, 22d are formed, respectively, into the upper housing from below, so that a loose joint becomes difficult to occur at, in particular, the bearing walls 23c, 23d to which radial acceleration due to the rotation of the counterweight portions 17 is applied.

A pump housing 24 is bolted to a front end face of the lower housing 14L in which a trochoid type oil pump (not shown) is accommodated for sending oil under pressure to respective portions of the engine. This oil pump (not shown) is provided at an axial end of the right balance shaft 13R, so that oil within the oil pan 5 is drawn in from an oil strainer 25 attached to a bottom wall of the lower housing 14L via a tubular passage 26 provided in a wall on one side of the lower housing 14L as the right balance shaft 13R rotates for sending under pressure oil so drawn in to the respective portions of the engine.

A mounting boss 28 for a strainer cover 27 for holding the oil strainer 25 is formed integrally on the lower housing 14L at a position below a side of the lower housing 14L where the lower one of the two balance shafts or the left balance shaft 13L is situated. This mounting boss 28 is generally formed into a cylindrical shape. The center of the mounting boss 28 is disposed between two of the bolts for fastening the upper housing 14U and the lower housing 14L together; one of the two bolts is provided between the two balance shafts 13L, 13R and the other bolt is provided outwardly of the left balance shaft 13L which is situated on the lower side. An outer circumferential portion of the mounting boss 28 connects to the bearing wall 23c where the half of the third bearing hole 22c which is situated at a longitudinally intermediate portion of the lower housing 14L is provided. Accordingly, the rigidity of the bearing wall 23c for fastening the upper housing 14U and the lower housing 14L is attempted to be increased.

The tubular passage 26 formed integrally in the wall on the one side of the lower housing 14L in such a manner as to extend in parallel with the axis of the left balance shaft 13L terminates at a joint surface of the lower housing 14L with the pump housing 24 at one end. Thus, the rigidity of the lower housing 14L is attempted to be increased by integrally forming the hollow tubular passage 26 in the wall of the lower housing 14L on the side thereof where the left balance shaft 13L is situated.

A fastening boss 30 through which the fastening bolt B1 for the lower block 3 is passed is provided at a position adjacent to a side of the terminating end portion of the tubular passage 26, and the provision of the fastening boss 30 contributes to increasing the fastening rigidity of the balancing system 4 to the lower block 3.

As has been described above, the oil strainer 25 is directly attached to the bottom wall of the lower housing 14L at the position below the lower left balance shaft 13L of the two balance shafts, and a central portion of the oil strainer 25 is disposed generally directly below a position adjacent to a vertical plane passing through the center of the crankshaft 1 or the center of gravity of the engine E. Thus, an inlet port 29 of the strainer cover 27 is situated at a position in a bottom-most portion of the oil pan 5 where there is least chance that the oil level changes without expanding the strainer mounting boss 28 largely downwardly. Consequently, even if the oil level changes due to longitudinal accelerations or centrifugal forces that would occur while the vehicle is running, there is no risk that the suction of oil is deteriorated.

Figure 7:
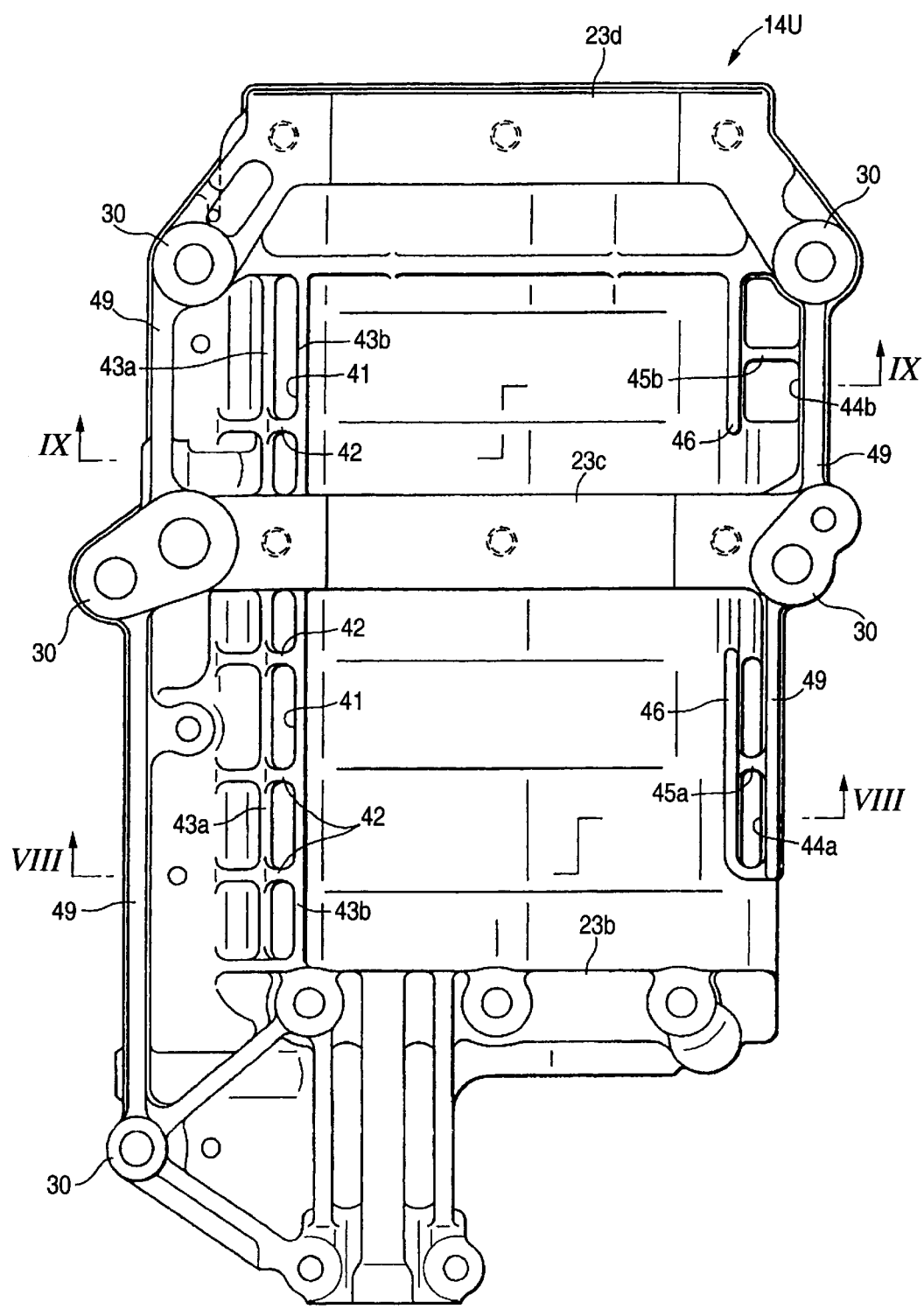
FIG. 7 is a top view of an upper housing of the balancing system of the first embodiment.
Figure 8:
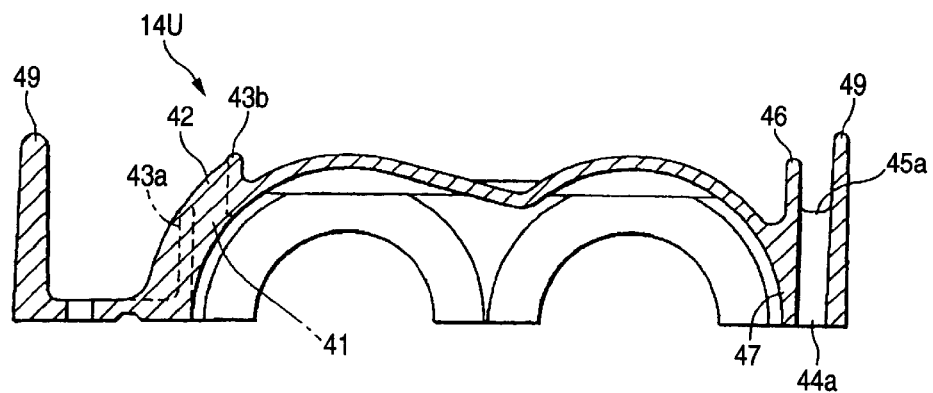
FIG. 8 is a sectional view taken along the line VIII—VIII in FIG. 7.
Figure 9:
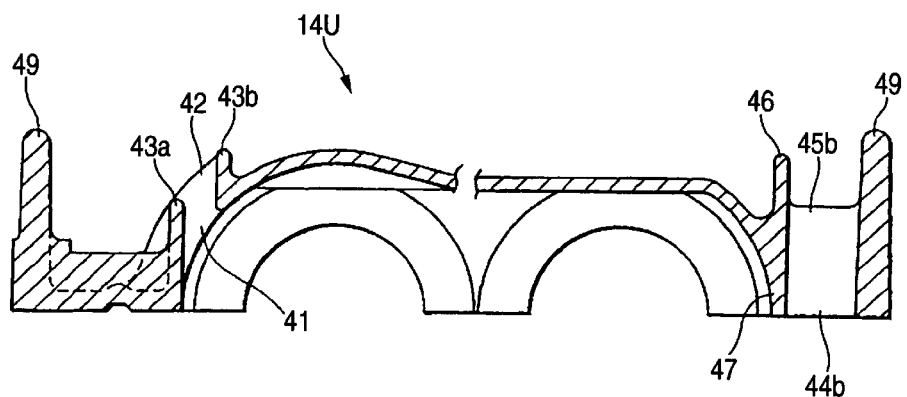
FIG. 9 is a sectional view taken along the line IX—IX in FIG. 7.
Figure 10:
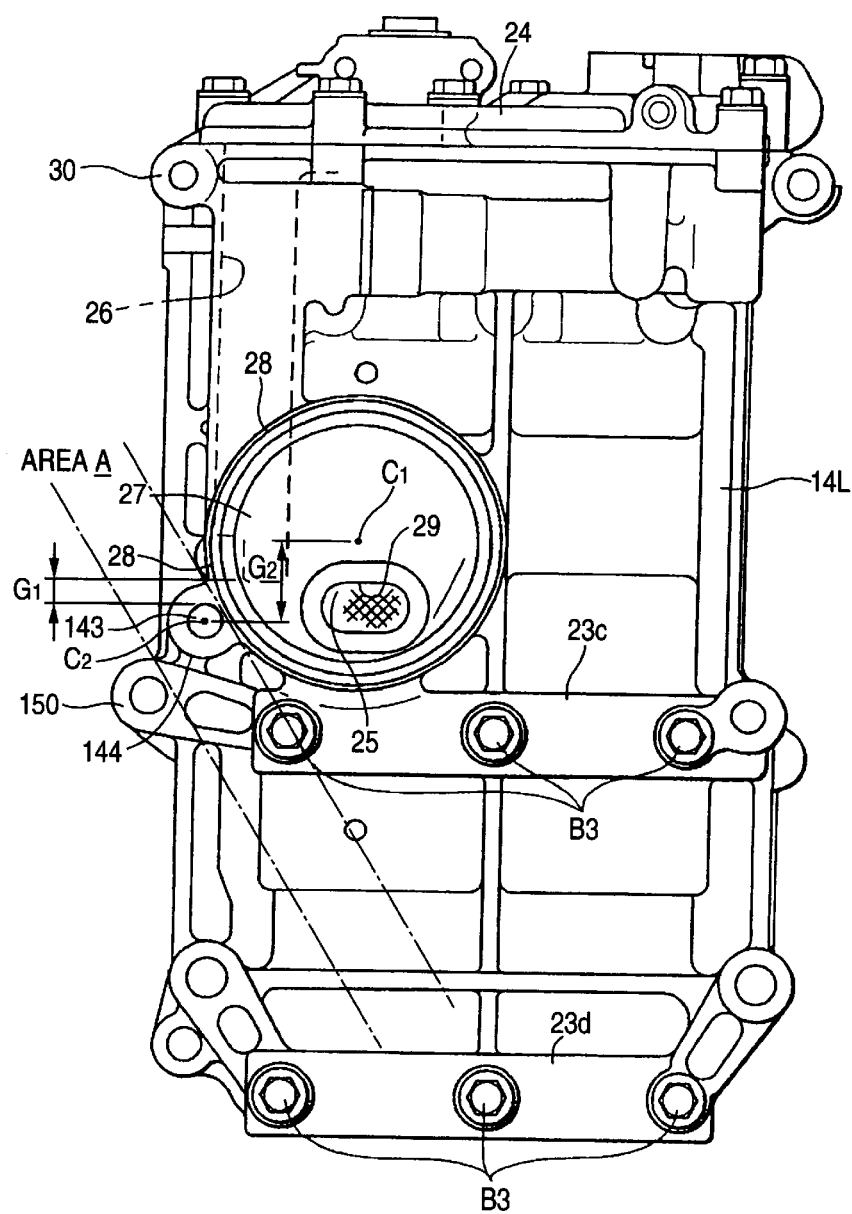
FIG. 10 is a bottom view of a lower housing of a balancing system of the second embodiment.

As shown in FIGS. 7 to 9, left longitudinally elongated oil discharge ports 41 are provided in the upper housing 14 on the left side of the left balance shaft 13L so as to extend along the axis of the balance shaft between the second bearing wall 23b and the third bearing wall 23c and between the third bearing wall 23c and the fourth bearing wall 23d. These left oil discharge ports 41 are each divided into a plurality of portions in a longitudinal direction by ribs 42 which then connect left and right inner edges of the plurality of portions.

Thus, the provision of the oil discharge ports 41 having desired areas in the longitudinal direction suppresses the decrease in rigidity of the upper housing 14U by connecting the inner edges of the oil discharge ports 41 by the ribs 42.

Two linear ribs 43a, 43b are provided so as to extend along both left and right side edge portions of the left oil discharge ports 41. These ribs 43a, 43b connect between the second bearing wall 23b and the third bearing wall 23c and between the third bearing wall 23c and the fourth bearing wall 23d and contribute to increasing the rigidity of the second to fourth bearing walls 23b to 23d. In addition, the left-side ribs 43a protrude upwardly to be above the oil level OL of oil stored in the oil pan 5 so that oil in the oil pan 5 is prevented from flowing into the housing 14U, 14L from the left oil discharge ports 41.

Right front elongated oil discharge port 44a is provided in the upper housing 14U on the right-hand side of the right balance shaft 13R between the second bearing wall 23b and the third bearing wall 23c along the axis of the balance shaft. In addition, right rear slightly wider oil discharge port 44b is provided between the third bearing wall 23c and the fourth bearing wall 23d. These oil discharge ports 44a, 44b are partitioned at intermediate portions thereof by ribs 45a, 45b, respectively.

Longitudinal ribs 46 are provided so as to extend along left side edges of the right oil discharge ports 44a, 44b which extend along the axis of the balance shaft. The rigidity of the upper housing 14U is attempted to be increased by the longitudinal ribs 46, and oil remaining on the upper surface of the upper housing 14U is restrained from falling into the housing from the right oil discharge ports 44a, 44b.

The longitudinal ribs 46 connect to vertical walls 47 which extend from portions of the left side edge portions of the right oil discharge ports 44a, 44b which extend in parallel with the axis of the balance shaft to a position which reaches a joint surface with the lower housing 14L. The decrease in rigidity of the upper housing 14U is attempted to be suppressed by these vertical walls 47 while securing the areas of the right oil discharge ports 44a, 44b. In addition, the vertical walls 47 prevent the direct contact of oil flowing in from the right oil discharge ports 44a, 44b to the right balance shaft 13R which is provided at a higher position where the contact of the balance shaft to oil is made easier, whereby oil does not constitute rotational resistance against the right balance shaft 13R and the atomization of oil is not promoted.

Thus, the provision of the oil discharge ports 41, 44a, 44b which open upwardly in the upper housing 14U allows oil remaining at the bottom of the lower housing 14L to be scooped upwardly by the counterweights 17 as both the balance shafts 13L, 13R rotate (in directions indicated by arrows in FIG. 2) to be discharged out of the housing 14U, 14L from the oil discharge ports 41, 44a, 44b so formed.

Ribs 49 are provided so as to extend on both left and right side edges of the upper housing 14U for connecting the bosses 30 through which the bolts B1 for fastening the balancing system 4 to the lower block 3 are passed, so that not only the fastening rigidity of the balancing system 4 to the lower block 3 is increased but also the penetration of oil splashing within the oil pan 5 into the respective oil discharge ports 41, 44a, 44b is prevented.

<Second Embodiment>

A description will be given of an in-line four-cylinder engine of the second embodiment with reference to FIGS. 1, 2, 10 to 14. The second embodiment is different from the first embodiment in structure of the upper and lower housings. Thus, the same reference numbers as the first embodiment designate the same members, and the detailed description thereof is omitted.

Figure 11:
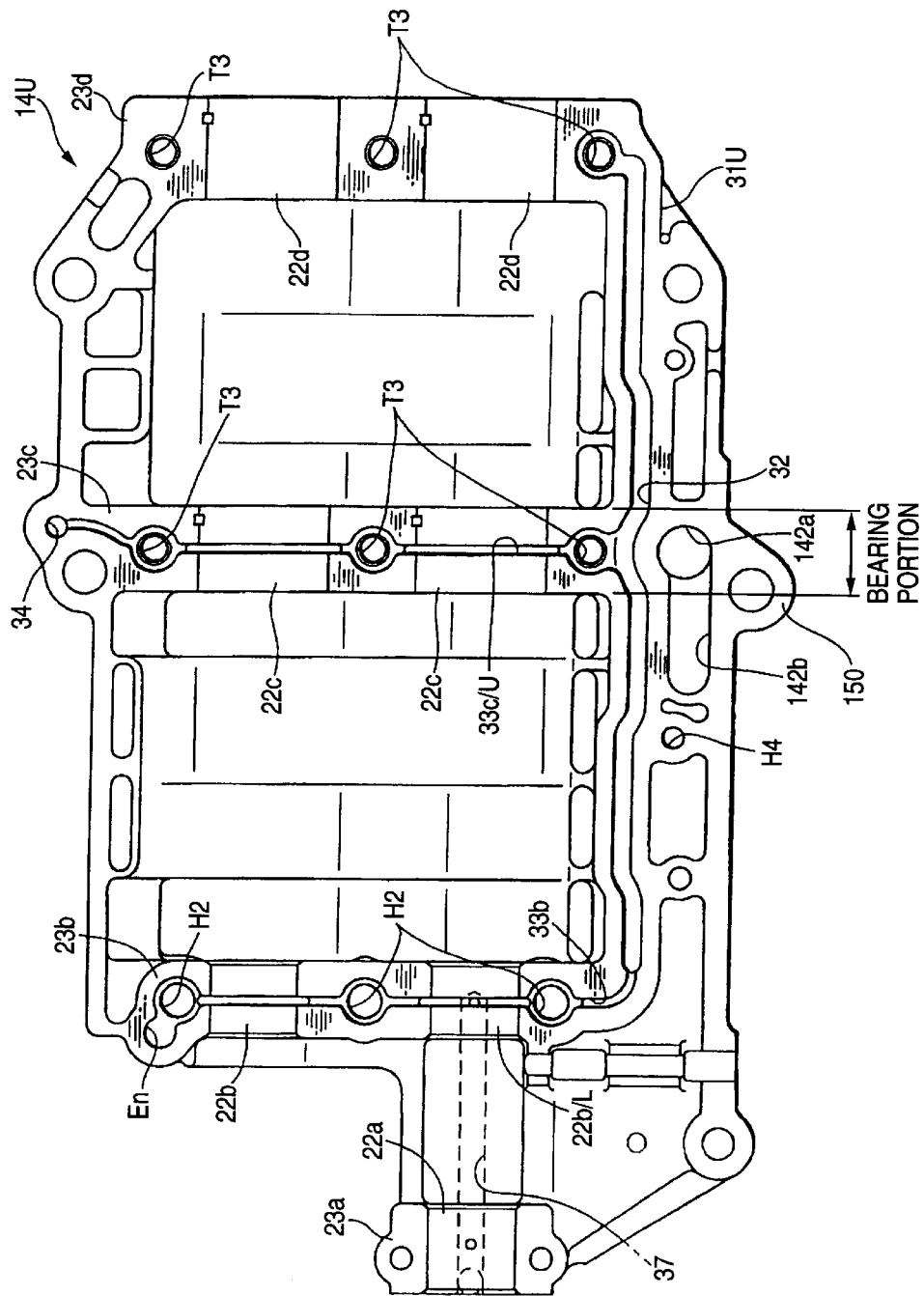
FIG. 11 is a bottom view of an upper housing of the balancing system of the second embodiment.
Figure 12:
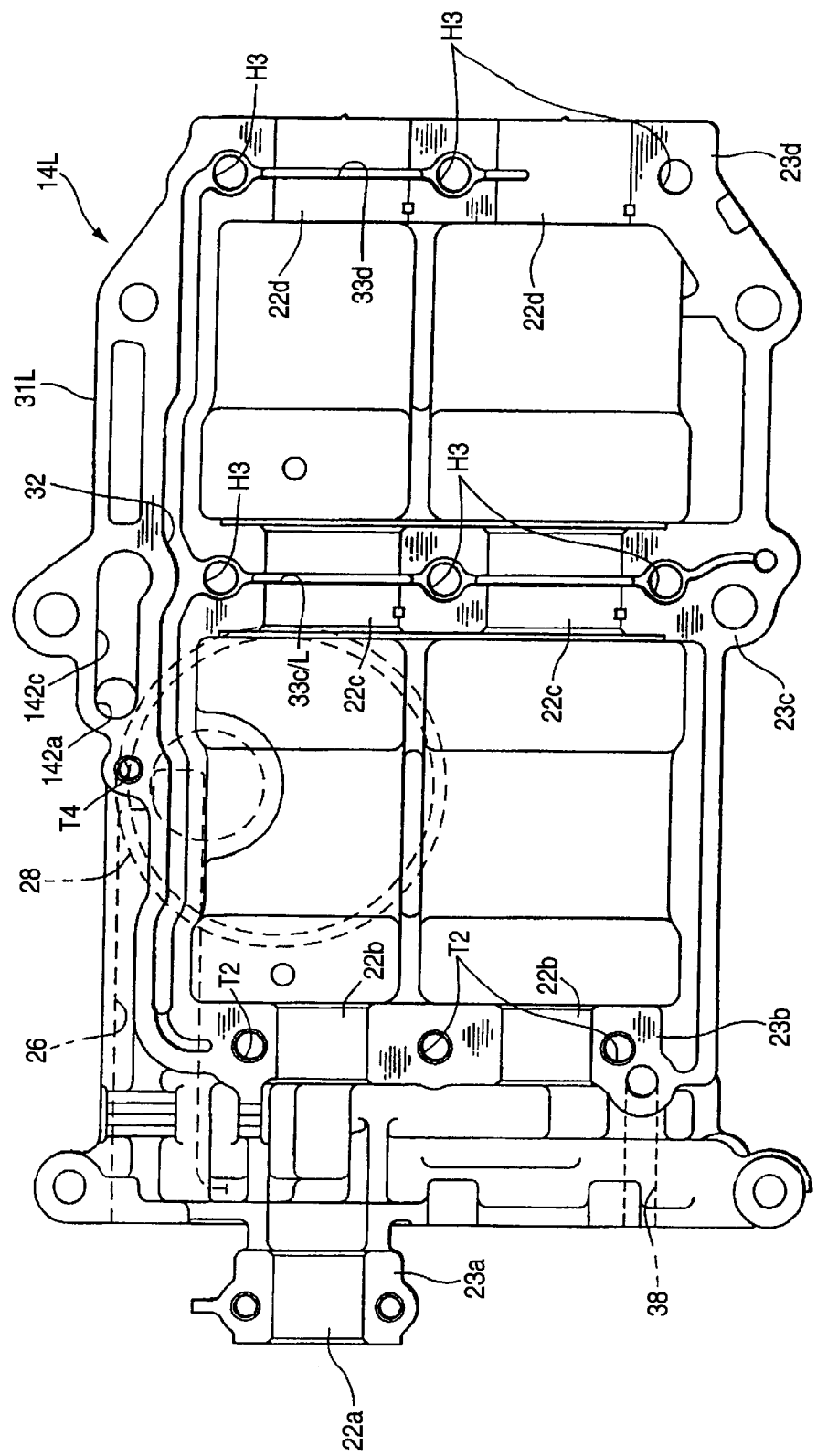
FIG. 12 is a plan view of the lower housing of the balancing system of the second embodiment.

An axial oil path 32 extending generally parallel to the axis of the balance shaft is provided to be recessed, respectively, in joint surfaces of left side walls 31U, 31L of both the upper and lower housings 14U, 14L, as shown in FIGS. 11 and 12. Then, diametrical oil paths 33b to 33d which branch off from the axial oil path 32 along the diametrical direction of the balance shafts and reach the second to fourth bearing holes 22b to 22d are provided to be recessed in joint surfaces of the second to fourth bearing walls 23b to 23d which correspond to the respective bearing holes.

The front diametrical oil path 33b is provided to be recessed in the second bearing wall 23b on the upper housing 14U so as to connect between through holes H2 for bolts B2 for fastening together both the upper and lower housings 14U, 14L via inner circumferential surfaces of the left and right bearing holes 22b. Then, an upper half 33c/U of the central diametrical oil path is provided to be recessed in the third bearing wall 23c so as to connect between internally threaded holes T3 into which bolts B3 for fastening together both the upper and lower housings 14U, 14L are screwed via inner circumferential surfaces of the left and right bearing holes 22c.

A lower half 33c/L of the central diametrical oil path is provided to be recessed in the third bearing wall 23c on the lower housing 14L so as to connect between through holes H3 for bolts B3 for fastening together both the upper and lower housings 14U, 14L via inner circumferential surfaces of both the left and right bearing holes 22c. Then, the rear diametric oil path 33d is provided to be recessed in the fourth bearing wall 23d in such a manner as to extend from an inner circumferential surface of the left bearing hole 22 to part of an inner circumferential surface of the right bearing hole 22d via the central bolt through hole H3.

These oil paths are each formed to have, for example, a semi-circular cross section during the casting process of both the upper and lower housings 14U, 14L, and in particular, the entirety of the axial oil path 32 and part of the diametric oil paths 33b to 33d become generally holes having a round contour when both the upper and lower housings 14U, 14L are jointed together.

Figure 13:
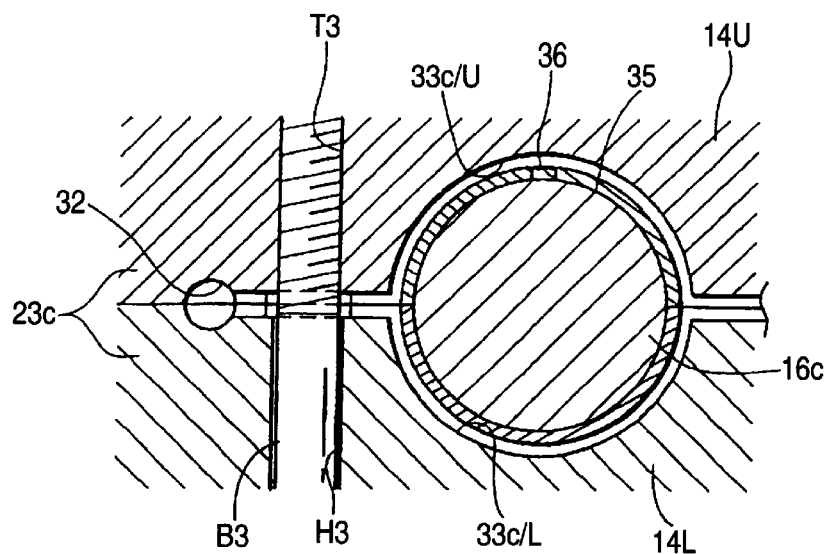
FIG. 13 is a partial sectional view of a third bearing wall of the second embodiment.

A through hole 34 extending along the axis of the cylinder is provided to be opened in a right terminal end of the central diametric oil path 33 provided in the third bearing wall 23c on the upper housing 14U so as to communicate with an engine oil supply passage (not shown) formed in the lower block 3 when the upper housing 14U is jointed to the lower face of the lower block 3, and as shown in FIG. 13, engine oil flowing into the central diametric oil passage 33c from the lower block 3 is partially supplied from an oil hole 36 opened in a metallic bearing 35 mounted to the third bearing hole 33c to a sliding contact surface with the third journal portion 16c while the remaining engine oil flows into the axial oil passage 32 and is then divided into the front and rear diametric oil paths 33b, 33d in the second bearing wall 23b and the fourth bearing wall 23d.

Engine oil that has reached the front diametric oil path 33b is then partly supplied, as in the same manner as described above, to a sliding contact surface with the second journal portion 16b from an oil hole opened in a metallic bearing mounted to the second bearing hole 22b on the upper housing 14U side, and thereafter, the engine oil is supplied to the first bearing hole 22a via a connecting path 37 constituted by a drilled hole from the left bearing hole 22b/L in the second bearing wall 23b. In addition, the remaining engine oil flows out of a drilled hole 38 opened from the joint surface with the pump housing 24 in the lower housing 14L in such a manner as to communicate with a terminal end En of the front diametric oil path 33b to be supplied to a chain tensioner (not shown) that is provided ahead.

Engine oil that has reached the rear diametric oil path 33d is supplied, as in the same manner as described above, to a sliding contact surface with the fourth journal portion 16d from an oil hole opened in a metallic bearing mounted to the fourth bearing hole 22d on the lower housing 14L side.

On the other hand, a return passage 41 as cast is formed in an axially central portion of the crankshaft 1 in the cylinder block 2 and the lower block 3 for returning engine oil from the cylinder head side to the oil pan 5. This return passage 41 opens in the lower surface of the lower block 3 and is connected to a passage (which will be described in detail later) internally formed in the upper housing 14U and lower housing 14L of the balancing system 4 jointed to the lower surface of the lower block 3.

Figure 14:
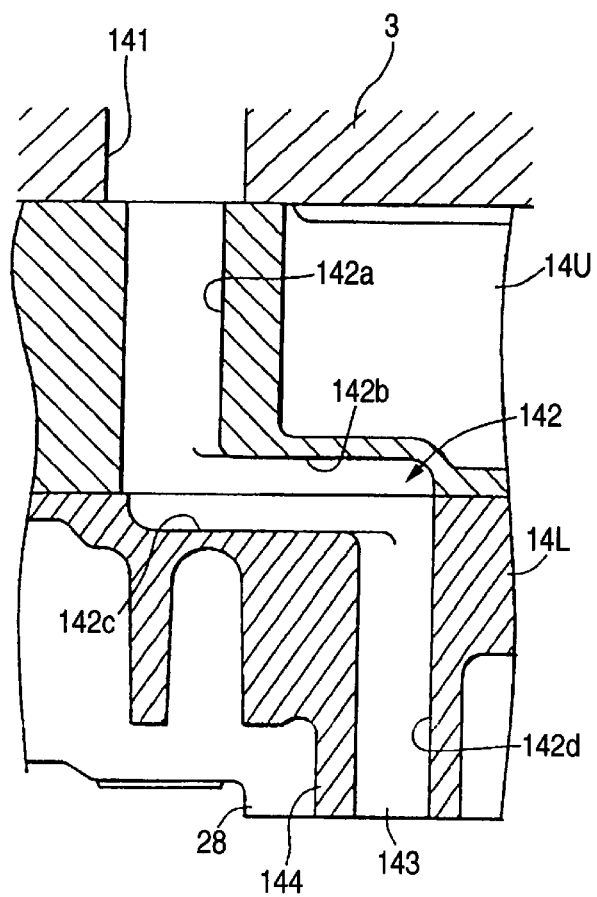
FIG. 14 is a partial sectional view of the second embodiment taken along the line XIV—XIV in FIG. 2.

As shown in FIG. 14 as well, formed in the upper housing 14U are a vertical hole 142a which penetrates vertically at a connecting portion between a left end of the third bearing wall 23c and the left wall 31U and a groove 142b having a semi-circular cross section which originates at a lower end of the vertical hole 142a to extend forward on the joint surface with the lower housing 14L. The vertical hole 142a is provided at a position which connects to a lower-end opening of there turn passage 142a in the lower block 3.

On the left side wall 31L of the lower housing 14L, a groove 142chaving a semi-circular cross section which aligns with the groove 142b in the upper housing 14U is formed in a joint surface with the upper housing 14U, and a vertical hole 142d which originates from a front end of the groove 142cand penetrates vertically is formed in a thicker portion of the left sidewall 31L. The opening of this vertical hole 142d or an oil discharge port 143 is provided so as to open at a lower end of a tubular portion 144 directly connected to a left side portion of the strainer cover mounting portion 28 integrally formed on the lower housing 14L, in other words, at a position situated adjacent to the left to a suction port 29 formed in the strainer cover 27 holding the oil strainer 25, whereby since the oil discharge port 143 can be provided at a position allowing the oil discharge port 143 to be submerged below the oil level OL at all times even if there occurs a change in vehicle posture or driving condition, the mixing of air with engine oil within the oil pan 5 can be prevented. Moreover, since the tubular portion 144 is made integral with the strainer cover mounting portion 28, high rigidity can be obtained, and since the lower end face is allowed to extend the same position as that of the strainer cover mounting portion 28, the strainer cover mounting portion 28 and the opening surface of the tubular portion 144 can be machined simultaneously, thereby making it possible to avoid an increase in man hours for machining.

These vertical holes 142a, 142d and the grooves 142b, 142care constructed so as to form a downstream portion 142 functioning as part of an engine oil return passage that is bent in a crank-like fashion to communicate vertically in the balancing system 4 when both the upper and lower housings 14U, 14L are jointed together, and engine oil flowing in from the cylinder head via the return passage 141 provided in the lower block 3 is designed to be returned into the oil pan 5 via the downstream portion 142 of the return passage.

As has been described heretofore, since the downstream portion 142 of the return passage is bent in the crank-like fashion by the grooves 142b, 142cformed in the joint surfaces of both the upper and lower housings 14U, 14L, the open end of the vertical hole 142d in the lower housing 14L or the oil discharge-port 143 can be disposed at an appropriate position after the vertical hole 142a in the upper housing 14U is provided at a position which connects to the opening in the lower block 3. In particular, the oil discharge port 143 can be provided at a position where it is allowed to be submerged below the oil level OL at all times irrespective of vehicle postures or driving conditions by placing the oil discharge port 143 adjacent to the suction port 29 in the strainer cover 27 provided at a position on a bottom-most portion of the oil pan 5 where the variation in oil level is minimum.

In addition, even if engine oil flows in vigorously from the lower block 3 side, since the momentum of the flow is reduced when the flow strikes against the groove 42c in the lower housing 14L and the rate at which engine oil flows out from the oil discharge port 143 is lowered, there is no risk that engine oil stored within the oil pan 5 is stirred, and in addition to the fact that the oil discharge port 143 is submerged below the oil level OL at all times, it is possible to cause no inconvenience that engine oil is bubbled by air incorporated thereinto.

Further, the suction port 29 provided in the bottom face of the housing 14L and a lower end portion of the oil discharge port 143 of the return passage are provided in the same plane which is normal to the axis of the balance shaft 13L. This structure also can reduce the momentum of the flow, whereby there is no risk that engine oil stored within the oil pan 5 is stirred.

The tubular passage 26 formed in the housing 14L for establishing a communication between said oil strainer 25 and an oil pump and the return passage are provided at different positions with respect to the axis of the balance shaft 13L to have a gap $G_1$. Since both the passages do not overlap each other on the plane which is normal to the axis of the balance shaft, there is no risk that the construction of the return passage becomes complicated, and the reduction in rigidity of the housing 14L can be suppressed.

In addition, an oil strainer mounting surface provided on the bottom surface of the housing 14L is formed in a circular shape, and the center $C_1$ of the oil strainer mounting surface and the center $C_2$ of the lower end portion of the return passage deviate from each other in an axial direction of the balance shaft 13L to have a gap $G_2$. Therefore, the amount in which the return passage protrudes in a direction normal to the axis of the balance shaft 13L can be reduced.

Further, the vertical hole 142a of the return passage and the balance shaft bearing portion 23c are provided on the same plane which is normal to the axis of the balance shaft. According to this structure, since the rigidity of the balance shaft bearing portion 23c is high, the decrease in rigidity that would occur due to the provision of the return passage can be suppressed.

Since the return passage formed in the joint surfaces also extends in the axial direction of the balance shaft, the amount in which the return passage protrudes in a direction normal to the axis of the balance shaft can be suppressed.

Moreover, the return passage is provided on the balance shaft side of a fastening portion 150 for fastening said housing to a cylinder block or a lower block along said fastening portion 150. Thus, the amount in which the return passage protrudes outwardly can be suppressed.

The return passage (the oil discharge port 143) is provided in an area A between said fastening portion 150 and an oil strainer mounting portion 28 provided on the bottom surface of the lower housing 14L. Since the area A between the fastening portions and the oil strainer mounting portion is used effectively, not only can the enlargement of the housing but also the decrease in rigidity of the housing can be suppressed.

As has been described heretofore, conventionally, because the part of the thrust supporting face formed at the flange portion having the diameter greater than that of the journal portion which is situated on the opposite side of the balance shaft to the side thereof where the counterweight portions are provided has the cantilever-like construction on the outer circumference side thereof the rigidity thereof tended to be insufficient. However, according to the first aspect of the present invention, because the ribs are provided which are connected to the backs of the thrust supporting faces at the flange portions to extend in the axial direction on the opposite side of the balance shaft to the side thereof where the counterweight portions are provided, the rigidity of the thrust supporting faces with respect to the radial direction can be increased. Consequently, according to the first aspect of the present invention, there is provided a great advantage in performing a highly accurate thrust control.

In addition, according to the second aspect of the present invention, in addition to the construction as set forth in the first aspect of the invention, the journal portion is provided at the axially central portion of the counterweight portion, and the flange-like thrust supporting faces are integrally formed at the axial ends of the journal portion. According to the construction, because the rigidity of the journal portion to which the largest load is applied can be increased, the stable support of the balance shafts can be attained. In addition, in a case where lubricating oil is supplied to the journal portion, lubricating oil so supplied is held by the flange-like thrust supporting faces, the lubricating effect on the journal portion is improved.

In particular, according to the construction in which the two journal portions situated at the axial ends of the counterweight portion are connected together by the ribs (the construction as set forth in the second aspect), because the rigidity between the journal portions can be increased, the increase in weight can be suppressed by reducing the diameter of the shaft portions while obtaining the desired rotational mass. Furthermore, according to the construction of the third aspect in which the height of the rib is reduced such that there is provided a valley at the axially intermediate portion of the rib, the stress distribution can be normalized to thereby suppress the increase in weight further. Consequently, according to the constructions described above, there is provided a great advantage that the increase in weight due to reinforcement can be suppressed to a minimum level.

In addition, according to the fourth aspect of the present invention, because the vertical walls extend from the portions of the inner edge portions of the oil discharge ports formed in the upper housing which extend in parallel with the axis of the balance shaft toward the joint surface with the lower housing, there is provided an advantage in that the decrease in rigidity of the housing can be suppressed while securing the areas of the oil discharge ports, and on top of that, because the contact of oil flowing in from the oil discharge ports to the balance shaft is prevented by the vertical walls so formed, there is also provided an advantage that the increase in rotational resistance can be suppressed.

In addition, according to the fifth aspect of the present invention, because the vertical walls extend as far as the position where they reach the joint surface with the lower housing, not only can the decrease in rigidity of the upper housing be suppressed further but also the contact of oil flowing in from the oil discharge ports to the balance shaft can further be suppressed.

Furthermore, according to the sixth aspect of the present invention, because the two balance shafts which are different in height relative to the oil level are provided in parallel with each other in the housing, the vertical walls are formed on the upper housing on the side thereof where the one of the balance shafts is situated which is easier to contact oil flowing in from the oil discharge ports, and the oil inlet passage is provided in the lower housing on the side thereof where the other balance shaft is situated in such a manner as to extend in parallel with the axis of the balance shaft, there are provided not only an advantage that the rigidity of the upper housing on the side thereof where the one of the balance shafts is situated is increased to thereby increase the supporting rigidity of the one of the balance shafts but also an advantage that the contact of oil flowing in from the oil discharge ports to the one of the balance shafts is prevented. On top of this, there is provided another advantage that the rigidity of the lower housing on the side thereof where the other balance shaft is situated is increased by the oil inlet passage to thereby increase the supporting rigidity of the other balance shaft.

Moreover, according to the seventh aspect of the present invention, because the rigs which extend in parallel with the axis of the balance shaft and connect to the vertical walls are formed on the upper surface of the upper housing, there is provided an advantage that the rigidity of the upper housing can be largely increased to thereby increase further the supporting stability of the balance shafts, and at the same time there is also provided an advantage that oil remaining on the upper surface of the upper housing can be prevented from entering the interior of the housing from the oil discharge ports.

Further, according to the eighth aspect of the present invention, because the part of the return passage for returning engine oil from the cylinder head to the oil pan is provided inside the balancing system, there is provided a great advantage in reducing the number of components of the engine itself, as well as man hours for production.

In addition, according to the ninth aspect of the present invention, because the part of the return passage is formed in the joint surfaces of both the upper and lower housings, the degree of freedom in setting the oil discharge port can be increased, and additionally the rate at which return oil flows out can be lowered.

Furthermore, according to the tenth aspect of the present invention, because the oil discharge port is disposed adjacent to the suction port of the oil strainer, there is provided a great advantage in making it difficult for the oil discharge port to be affected by changes in vehicle postures or driving conditions. In particular, according to the fourth aspect of the present invention wherein the opening of the oil discharge port is directly connected to the oil strainer mounting portion integrally formed on the bottom of the housing, there are provided advantages not only that the oil discharge port can be made difficult to be affected by changes in vehicle postures or driving conditions but also that the rigidity of the portion where the oil discharge port opens can be enhanced.

What is claimed is:

1. An engine including an engine oil return passage for returning engine oil from a cylinder head side to an oil pan, comprising:
   a balance shaft forming a balancing system for said engine; and
   a housing disposed below a crankshaft for accommodating rotatably therein said balance shaft,
   wherein a part of said engine oil return passage is provided in said housing.

2. The engine according to claim 1, wherein said housing comprises an upper housing and a lower housing which are divided vertically, and wherein a part of said return passage is formed in a joint surface between both said housings.

3. The engine according to claim 1, wherein an oil discharge port of said return passage opens at a position adjacent to a suction port of an oil strainer provided on a bottom face of said housing.

4. The engine according to claim 3, wherein a portion in which said oil discharge port opens is directly connected to an oil strainer mounting portion which is integrally formed on the bottom face of said housing.

5. The engine according to claim 1, wherein a lower end face of said return passage and an oil strainer mounting face provided on a bottom face of said housing are situated at the same position.

6. The engine according to claim 1, wherein a suction port provided in a bottom face of said housing and a lower end portion of an oil discharge port of said return passage are provided in the same plane which is normal to an axis of said balance shaft.

7. The engine according to claim 1, wherein a tubular passage formed in said housing for establishing a communication between an oil strainer and an oil pump and said return passage are provided at different positions with respect to an axis of said balance shaft.

8. The engine according to claim 1, wherein an oil strainer mounting face provided on a bottom face of said housing is formed in a circular shape, and wherein the center of said oil strainer mounting face and the center of a lower end portion of said return passage deviate from each other in an axial direction of said balance shaft.

9. The engine according to claim 1, wherein said housing comprises an upper housing and a lower housing which are divided vertically along a plane parallel to an axis of said balance shaft, wherein said upper housing comprises an oil discharge port and a vertical wall provided so as to extend from a portion at an inner edge portion of said oil discharge port which extends in parallel with the axis of said balance shaft toward a joint surface thereof with said lower housing.

10. The engine according to claim 9, wherein said vertical wall extends to reach said joint surface with said lower housing.

11. The engine according to claim 9, wherein said balance shaft comprises two balance shafts provided within said housing, said two balance shafts having different heights from each other relative to an oil level and being parallel to each other, wherein said vertical wall is formed on a side of said upper housing where one of said balance shafts is disposed which is easier to contact oil flowing in from said oil discharge port, and wherein at least part of an oil inlet passage communicating from an oil strainer to an oil pump is provided in said lower housing on a side thereof where the other of said balance shafts is disposed in such a manner as to extend in parallel with the axis of said balance shaft.

12. The engine according to claim 9, wherein said upper housing has a rib formed on an upper face thereof which is parallel to the axis of said balance shaft and which connects to said vertical wall.

13. The engine according to claim 1, wherein said balance shaft has a flange-like thrust supporting face which is integrally formed on a journal portion for restricting axial movements of a counterweight portion, said balance shaft having a larger diameter than that of said journal portion, wherein said balance shaft further includes a rib connected to a back of said flange-like thrust supporting face and extending in an axial direction on an opposite side to a side where said counterweight portion is provided.

14. The engine according to claim 13, wherein said journal portion is provided at an axially central portion of said counterweight portion, and wherein said flange-like thrust supporting face is integrally formed at an axial end of said journal portion.

15. The engine according to claim 13, wherein said journal portion is provided at axial ends of said counterweight portion, and wherein said rib connects said two journal portions situated at the axial ends of said counterweight portion.

16. The engine according to claim 15, wherein the height of said rib is gradually reduced so as to define a valley at an axially intermediate portion of said rib.

17. The engine according to claim 1, wherein at least part of said return passage and a balance shaft bearing portion are provided on the same plane which is normal to the axis of said balance shaft.

18. The engine according to claim 2, wherein the return passage formed in said joint surfaces extends in the axial direction of said balance shaft.

19. The engine according to claim 1, wherein said return passage is provided on the balance shaft side of a fastening portion for fastening said housing to a cylinder block or a lower block along said fastening portion.

20. The engine according to claim 19, wherein said return passage is provided between said fastening portion and an oil strainer mounting portion provided on the bottom face of said housing.

* * * * *